United States Patent
Sager et al.

(10) Patent No.: US 7,219,009 B1
(45) Date of Patent: May 15, 2007

(54) SHORT RUNNER VALVE DIAGNOSTIC

(75) Inventors: Roger C Sager, Munith, MI (US);
David P Ploucha, Ann Arbor, MI (US);
Thomas Stephens, Pinckney, MI (US);
Craig Keighron, Oak Park, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 11/339,943

(22) Filed: Jan. 26, 2006

(51) Int. Cl.
*B06T 19/00* (2006.01)
*G06F 19/00* (2006.01)

(52) U.S. Cl. ................................ 701/114; 701/102

(58) Field of Classification Search ........... 701/101, 701/102, 103, 107, 108, 114, 115
See application file for complete search history.

(56) References Cited

U.S. PATENT DOCUMENTS

| | | | |
|---|---|---|---|
| 7,028,650 B2 * | 4/2006 | Lewis et al. ............. 123/90.11 |
| 7,031,821 B2 * | 4/2006 | Lewis et al. ................. 701/102 |
| 7,079,935 B2 * | 7/2006 | Lewis et al. ................. 701/102 |
| 2005/0205028 A1 * | 9/2005 | Lewis et al. ............. 123/90.11 |
| 2005/0205047 A1 * | 9/2005 | Lewis et al. ............. 123/198 F |

* cited by examiner

*Primary Examiner*—John T. Kwon
(74) *Attorney, Agent, or Firm*—Thomas A. Jurecko

(57) ABSTRACT

A method of diagnosing an operating condition of a short runner valve in an intake manifold of an internal combustion engine using an exhaust sensor in an exhaust manifold of the internal combustion engine. The short runner valve is commanded to an open position for a test period, it is resolved whether the test period has elapsed, and it is determined whether a sensed exhaust gas parameter has exceeded a threshold during the test period. A pass signal is issued if the sensed exhaust gas parameter has exceeded the threshold within the test period. Otherwise, a fail signal is issued if the sensed exhaust gas parameter has not exceeded the threshold within the test period.

21 Claims, 4 Drawing Sheets

SHORT RUNNER VALVE DIAGNOSTIC

FIELD OF THE INVENTION

The present invention relates generally to a system and method for diagnosing valve operation in an engine intake manifold.

BACKGROUND OF THE INVENTION

A typical internal combustion engine may include an air intake manifold including dual flow paths between a throttle valve and engine combustion chambers. The dual flow paths typically include a long runner plenum and long runner passages, and a short runner plenum and short runner passages. A short runner valve closes to block the short runner passages and thereby force airflow through the long runner plenum and long runner passages. Conversely, the short runner valve opens to unblock the short runner passages and thereby permit airflow through both of the dual flow paths. Thus, the short runner valve controls airflow through the long and short runners, to optimize volumetric efficiency of the engine at both high and low engine speed ranges.

It is desirable to verify that the short runner valve is operating properly in order to ensure desired engine emissions performance. The short runner valve operation may be diagnosed using a valve position sensor, but that approach requires additional hardware and software and, thus, increases the cost of the engine.

SUMMARY OF THE INVENTION

A method of diagnosing an operating condition of a short runner valve in an intake manifold of an internal combustion engine is provided. The method includes commanding the short runner valve to an open position for a test period, resolving whether the test period has elapsed, and determining whether a sensed exhaust gas parameter has exceeded a threshold during the test period. The method also includes issuing a pass signal if the sensed exhaust gas parameter has exceeded the threshold within the test period, and issuing a fail signal if the sensed exhaust gas parameter has not exceeded the threshold within the test period.

In one presently preferred implementation, the above-described method steps are carried out if certain process enable conditions are met. For example, the enable conditions are preferably met if an engine running elapsed time is greater than about two minutes, engine coolant temperature is greater than about 70 degrees Celsius, vehicle speed is between about 26 and about 75 MPH, and engine speed is between about 3500 and about 4200 RPM.

BRIEF DESCRIPTION OF THE DRAWINGS

These and other objects, features and advantages of the present invention will be apparent from the following detailed description of the preferred embodiments and best mode, appended claims and accompanying drawings in which:

DETAILED DESCRIPTION OF PREFERRED EMBODIMENTS

Figure 1:
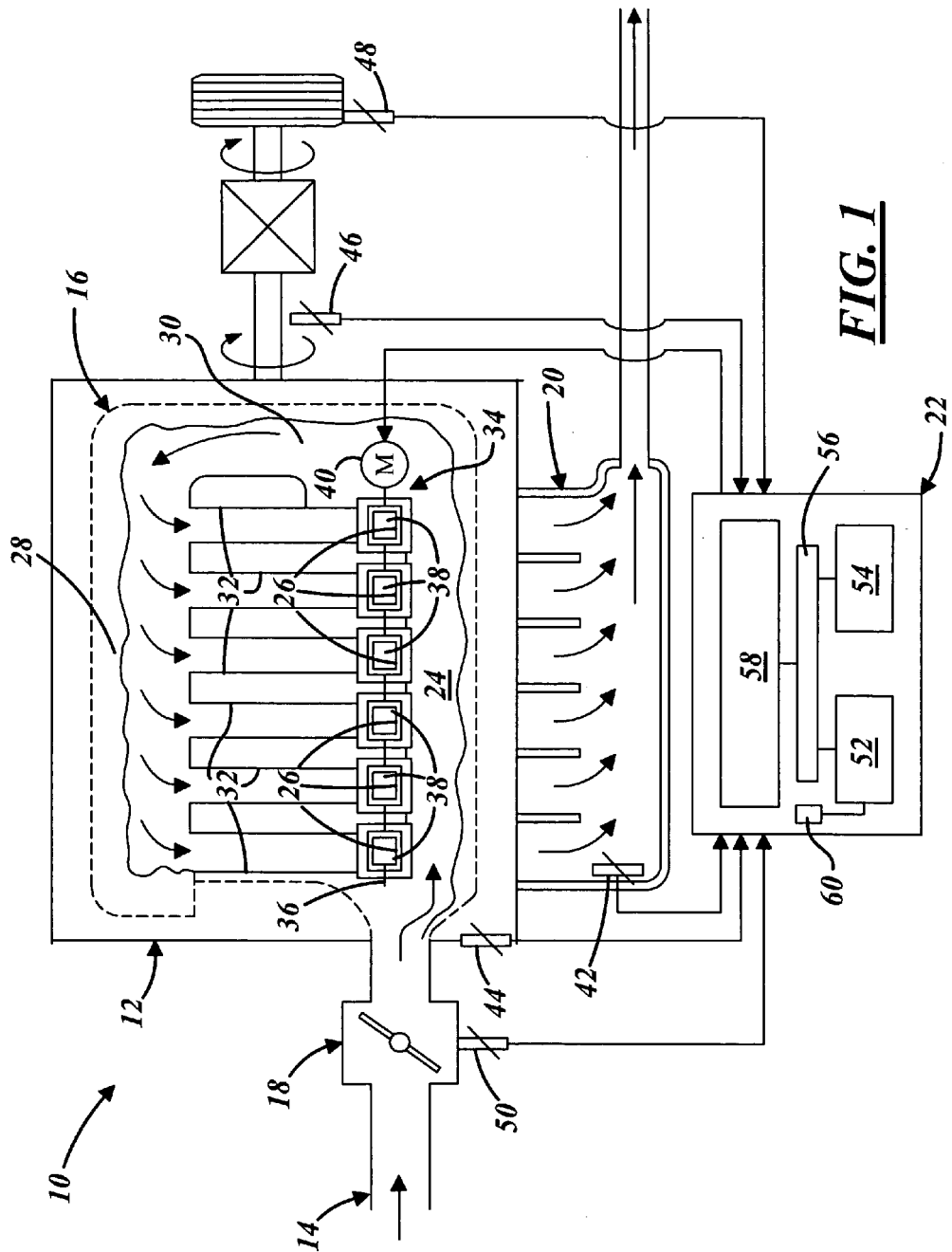
FIG. 1 is a schematic view of one embodiment of an internal combustion engine system showing various elements of a short runner valve diagnostic system.

Referring in more detail to the drawings, FIG. 1 schematically illustrates an exemplary motor vehicle engine system 10 that includes an internal combustion engine 12 having combustion chambers (not shown) wherein fuel and air are combusted and converted into mechanical energy. The engine system 10 also includes an air intake 14 for receiving air into the engine 12, an intake manifold 16 for collecting the received air and distributing it to combustion chambers (not shown) of the engine 12, and a throttle valve 18 disposed between the air intake 14 and intake manifold 16 to control airflow into the intake manifold 16. The engine system 10 further includes an exhaust manifold 20 through which combustion gases flow from the engine 12, and an electronic engine control module (ECM) 22 that defines a portion of a short runner valve control system and communicates with various other motor vehicle components as will be described in detail herein below.

The intake manifold 16 defines an airflow path between the throttle valve 18 and each combustion chamber of the engine 12. Two parallel airflow passages are provided in the flow path, wherein the airflow passages are divided downstream of the throttle valve 18 and converge upstream of the combustion chambers. The first of the two airflow passages includes a short runner path defined by a short runner plenum 24 and a short runner 26 for each combustion chamber, and the second flow passage includes a long runner path defined by a long runner plenum 24, 28, 30, which includes the short runner plenum 24, an opposed plenum 28, and a branch plenum 30 therebetween, and is further defined by a long runner 32 for each combustion chamber.

A short runner valve 34 includes a common shaft 36 and butterfly valves 38 carried by the shaft 36. The common shaft 36 preferably runs centrally through the short runners 26 and is operably coupled to the butterfly valves 38. Each valve 38 is disposed at an entrance to each of the short runners 26 and opens and closes to control airflow therethrough. A motor 40 is coupled to the common shaft 36 to rotate or pivot the shaft 36 to open the valves 38. Preferably, a spring (not shown) on the shaft 36 and/or on the motor 40 yieldably biases the shaft 36 and valves 38 toward a closed position when the motor 40 is not energized. Any other suitable actuation device could be used instead of the motor 40, and any other suitable valve devices could be used instead of the butterfly valves 38 and shaft 36.

In a state when the valve 34 is closed, the intake manifold 16 is referred to as being in a closed mode since intake air is only permitted to flow through the long runners 32 into the combustion chambers. The valve 34 is preferably closed at a point below a second predetermined engine speed. This point is generally when the throttle 18 is in a less than wide open position. For example, at idle or low engine speed, the short runner valve 34 closes to block the short runners 26, and the intake air must pass through the long runner plenum 24, 28, 30 and long runners 32 to reach the combustion chambers to provide relatively high torque output at relatively low engine speeds (RPM).

When the motor 40 is energized, the butterfly valves 38 are moved by the shaft 36 and held in an opened state. When the valves 38 are opened, the intake manifold 16 is referred to as being in an opened mode since intake air is permitted to flow through the short runners 26, as well as the long runners 32, into the combustion chambers. The short runner valve 34 is preferably opened at a point above a predetermined engine speed. This point is generally when the throttle valve 18 is in a wide open position. For example, at relatively high engine speeds, the short runner valve 34 opens to unblock the short runners 26, and the intake air flows through both the short runner plenum 24 and the short runners 26, as well as the long runner plenum 24, 28, 30 and the long runners 32 to reach the combustion chambers to provide relatively high torque output at relatively high engine speed (RPM). Accordingly, the torque available from the engine 12 is optimized over a broad range of engine speeds by an induction system of short runners 24 and long runners 32 that are employed at different times depending on engine speed.

The short runner valve control system carries out a short runner valve diagnostic method. The short runner valve control system preferably includes the ECM 22 for storing and executing instructions to carry out the short runner valve diagnostic method. The control system also preferably includes the short runner valve motor 40 for moving the short runner valve 34, and an air flow measurement device, such as an exhaust emissions sensor 42 for sensing an exhaust gas parameter. The exhaust gas parameter is preferably a fuel-to-air ratio in the combustion gases and, more specifically, is a change in the fuel-to-air ratio known as a fuel shift. In a presently preferred implementation, the parameter is a negative fuel shift. The exhaust emissions sensor 42 is preferably an oxygen sensor, but any other suitable sensor(s) may be used. The control system may also include other components such as a coolant temperature sensor 44 to sense the temperature of the coolant in the engine 12, a crankshaft speed sensor 46 to sense the rotational engine speed in revolutions per minute (RPM), and a vehicle speed sensor 48 to sense translational vehicle speed. The control system may further include a throttle position sensor 50 in communication with the ECM 22 for sensing the rotational position of the throttle valve 18. It should be appreciated that the control system may include any other hardware and software suitable to carry out or perform the short runner valve control methodology.

ECM's are generally known to those of ordinary skill in the art and the ECM 22 is responsible for receiving input from various vehicle and engine sensors or other components, carrying out various engine control functions including the short runner valve diagnostic, and transmitting various output signals including motor control signals and pass and fail signals. To facilitate such functionality, the ECM 22 may include a microprocessor 52 configured to execute control logic that provides the functionality for the short runner valve diagnostics, and volatile and non-volatile memory 54 for storing control logic and/or data. The ECM 22 may also include a communication bus 56 to communicate between the various ECM devices, input/output modules 58 that provide an interface between the ECM 22 and other components, a clock device 60, and any other suitable hardware and software to perform tasks of engine control. The ECM 22 transmits and receives electrical signals to and from the various sensors 42–50 and other components of the control system.

The short runner valve control system described above is capable of carrying out a method of diagnosing an operating condition of a short runner valve in an intake manifold of an internal combustion engine using an exhaust sensor in an exhaust manifold of the internal combustion engine. The operating condition is preferably whether the short runner valve 34 is open as intended or closed because of some error. The method may be carried out as a computer program and stored in the memory 54. Computer programs or software may include executable instructions or control logic for implementing logical functions of the system and can be embodied in any computer-readable medium stored in the memory 54 for use by or in connection with the microprocessor 52, which can retrieve and execute the instructions.

Figure 2:
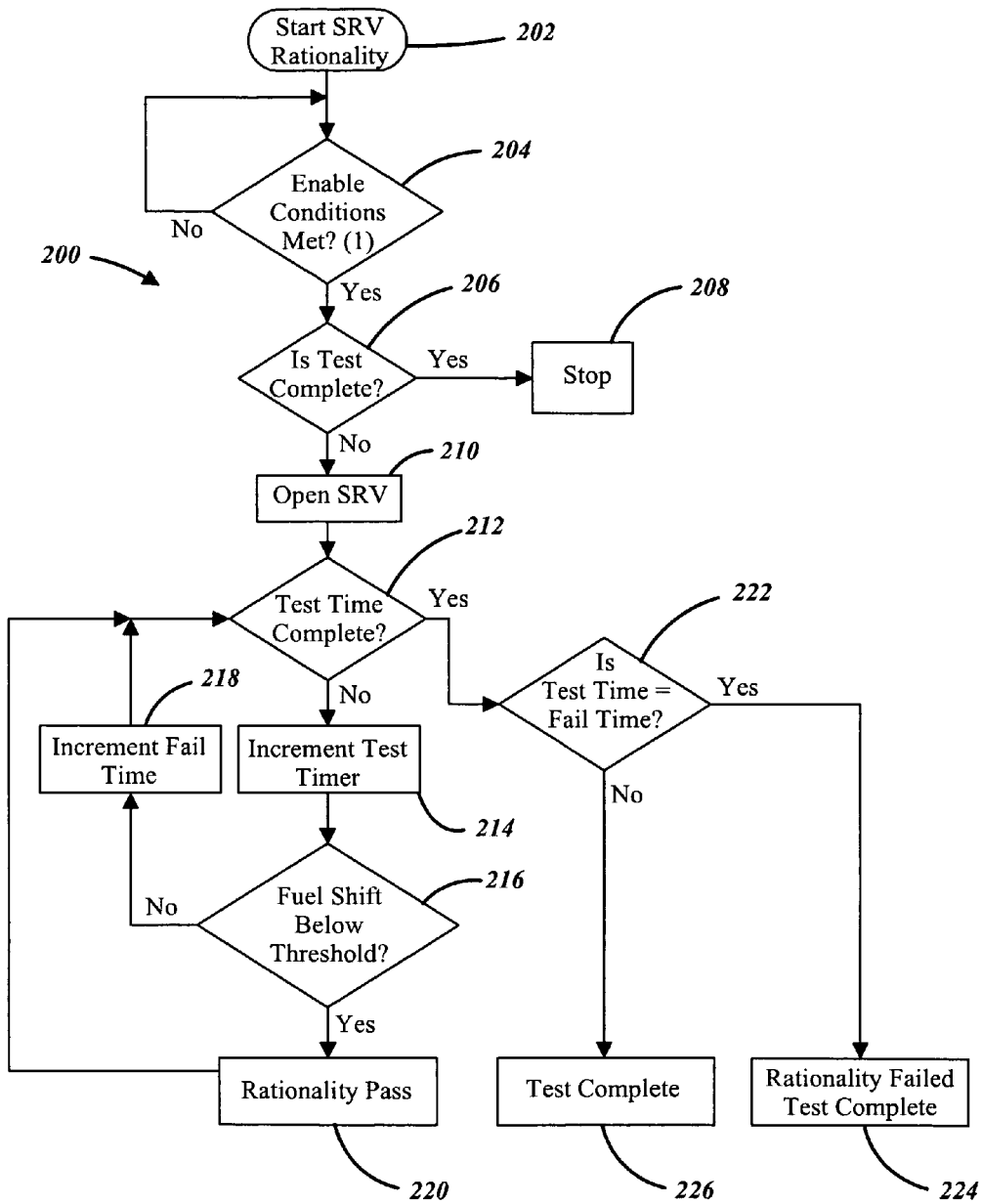
FIG. 2 is a flow chart of one embodiment of a method of diagnosing a short runner valve.

An exemplary method 200 is illustrated in FIG. 2, and is initialized at step 202 wherein enable conditions for a diagnostic routine are monitored. The enable conditions preferably include certain values or ranges of values of particular engine and/or vehicle parameters, which preferably include engine coolant temperature, engine speed, vehicle speed, and an engine running elapsed time. The engine running elapsed time represents the amount of time that has passed since the engine was last started. It is contemplated that the parameters could also include cruise control settings, engine pressure ratios, closed loop vs. open loop fuel control, engine purge modes, throttle position, and the like.

At step 204 it is determined whether the enable conditions are met. The enable conditions may be met, for example, when magnitudes of the engine and/or vehicle parameters are within certain ranges or exceeding (above or below) certain thresholds. The following enable conditions may be used in carrying out the method 200: engine running elapsed time; engine coolant temperature; vehicle speed; and engine speed. Preferably, the enable conditions are met if the engine running elapsed time and engine coolant temperature are greater than respective target values, and if the vehicle speed and engine speed are between respective minimum and maximum reference values. More specifically, the enable conditions are preferably met if engine running elapsed time is greater than about two minutes, engine coolant temperature is greater than about 70 degrees Celsius, vehicle speed is between about 26 and about 75 MPH, and engine speed is between about 3500 and about 4200 RPM. If the enable condition(s) are not met, then the process loops back between steps 202 and 204. If the enable condition(s) are met, then the process continues to step 206.

At step 206 it is determined whether the diagnostic routine has already been carried out within the engine running elapsed time. If so, then the process is stopped at step 208 and will not be started again until after the engine 12 is shut off and thereafter restarted. If the diagnostic routine has not been carried out within the engine running elapsed time, then the diagnostic routine is initiated.

At step 210, the short runner valve 34 is commanded to an open position for a test period. The test period may be any suitable period, for example, about 1 to 5 seconds or longer.

At step 212, it is resolved whether the test period has elapsed or not. If not, then the routine proceeds to step 214.

At step 214, a test timer is incremented to keep track of elapsed time within the test period and then the routine continues to step 216.

At step 216, an exhaust gas fuel-to-air ratio is monitored, preferably using the exhaust sensor 42 as an input, to determine if a negative fuel shift occurs. A negative fuel shift is indicative that the fuel-to-air ratio suddenly runs "leaner" due to increased airflow relative to liquid fuel being supplied to the combustion chambers of the engine 12. The signal received from the exhaust sensor 42 is processed and compared to a threshold. The threshold may be an absolute value, a percentage drop in magnitude of the fuel-to-air ratio, a relative differential value, or the like. If the sensed fuel-to-air ratio has not dropped below the threshold (or a differential value has not increased above a given threshold), then the routine proceeds to step 218.

In step 218, a fail timer is incremented. From step 218, a continuous loop of steps 212 through 218 is carried out until, at step 216, it is determined that the fuel shift has dropped below the threshold.

If, at step 216, the sensed fuel-to-air ratio has dropped below the threshold, then the routine proceeds to step 220 wherein it is inferred that the valve 34 opened properly and a pass signal is issued. From step 220, a continuous loop of steps 212 through 220 is carried out until, at step 212, it is determined that the test time is complete, whereafter the routine proceeds to step 222.

At step 222, the elapsed time of the test period is compared to the elapsed fail time. If the test time is equal to the fail time, then the diagnostic failed and it is inferred that the short runner valve 34 did not open and the routine ends at step 224. If, however, the test time is not equal to the fail time, then it is concluded that the diagnostic passed and the routine ends at step 226.

Figure 3:
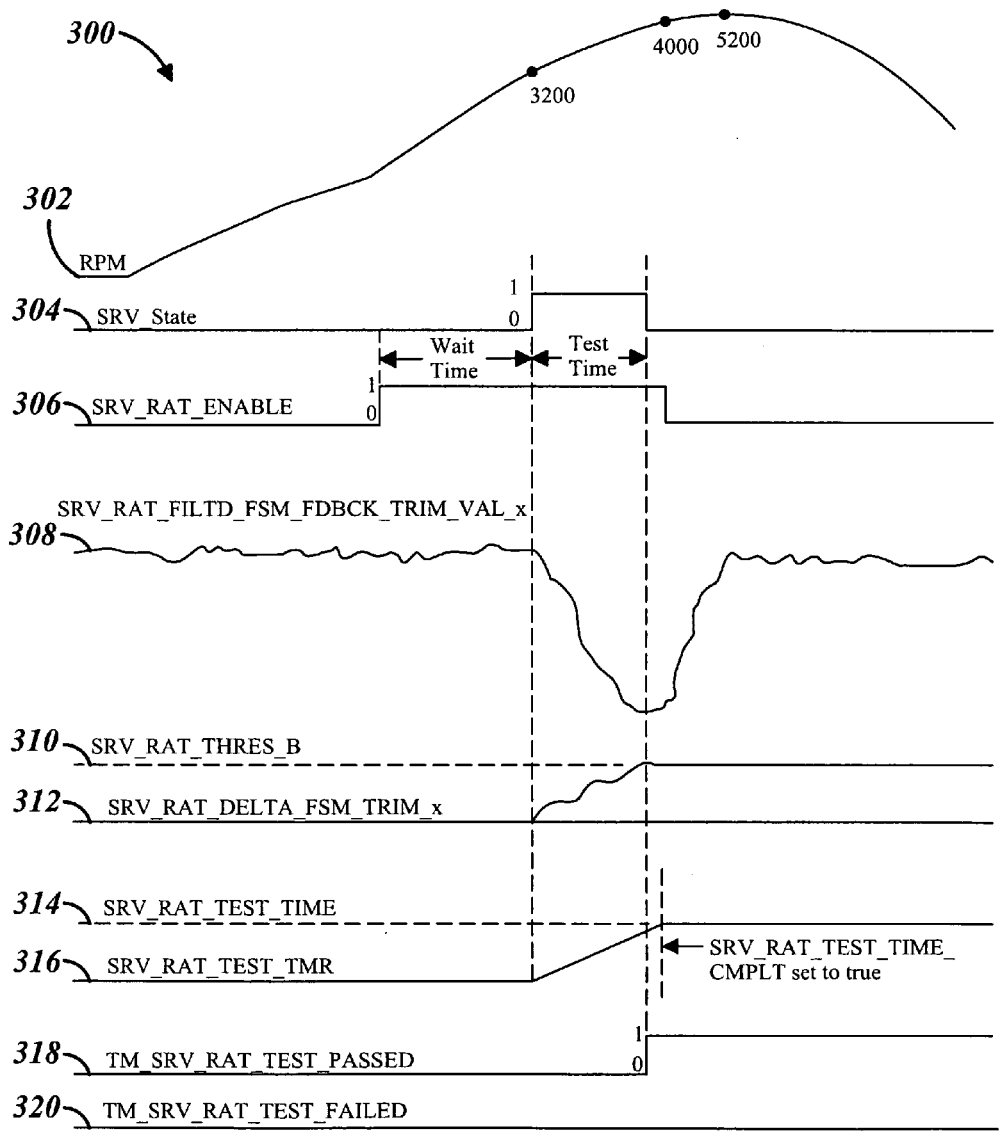
FIG. 3 is a signal plot of a successful short runner valve diagnostic showing traces of various signals generated by the short runner valve diagnostic system in carrying out the method.

FIG. 3 shows a signal plot from a successful run of the short runner valve diagnostic method. The plot illustrates traces of various signals generated by the short runner valve diagnostic system in carrying out the method.

Trace 302 shows an engine speed curve from, for example, a minimum of zero RPM to a maximum of 5200 RPM.

Trace 304 shows a commanded state of the short runner valve 34 from a closed state "0" to an open state "1". By transmitting a signal to enable the motor 40 to be energized, the ECM 22 commands the short runner valve 34 open at an engine speed that corresponds to a peak engine torque or at least within an engine speed range over which peak engine torque occurs. For example, the ECM 22 preferably commands the short runner valve 34 to open at about 3200 RPM. The ECM 22 maintains the command to keep the short runner valve 34 open for a preset test period. Preferably, when the test period has elapsed and when the sensed exhaust gas fuel-to-air ratio has dropped below the threshold, the ECM 22 disables the signal keeping the short runner valve 34 open and, thus, the short runner valve 34 closes under the yieldable bias force of the short runner valve spring. At this time, control of the short runner valve 34 is restored to normal engine control outside of the diagnostic routine.

Trace 306 shows diagnostic enable command signal from a disabled state "0" to an enabled state "1". The signal is automatically generated by the ECM 22 when the enable condition(s) are met, but the diagnostic is not actually enabled unless a suitable wait time has elapsed and, at step 206 of the method, it is determined that the diagnostic routine has not yet been carried out within a current engine ignition cycle.

Trace 308 shows a fuel shift feedback signal received by the ECM 22 from the exhaust emissions sensor 42. In this plot of a successful short runner valve opening, the trace 308 begins to fall off immediately upon the short runner valve 34 being commanded open. The fuel shift trace 308 continues to decrease until the short runner valve 34 is permitted to close, at which point, the fuel shift reverses and, thus, the trace 308 rises.

Trace 310 represents a preset threshold for the fuel shift. For example, the threshold may be a differential value between normal fuel shift values and the fuel shift value once the short runner valve 34 has opened. The differential value preferably represents an approximate 15% drop in fuel-to-air ratio, although any suitable value may be used.

Trace 312 represents a fuel shift differential that is zero until the short runner valve 34 opens, at which point the trace 312 begins to rise in correspondence to the decrease in fuel shift feedback signal trace 308. Once the trace 312 exceeds the threshold trace 310, the short runner valve command signal 304 is disabled.

Trace 314 represents a threshold for the test period. For example, any suitable time may be used between about 1 and 5 seconds or longer.

Trace 316 represents a test timer signal that is zero until the valve opens, at which point the trace 316 rises linearly in accordance with time. Once the trace 316 exceeds the timer threshold trace 314, the diagnostic enable command signal 306 is disabled.

Trace 318 represents a diagnostic "pass" signal that the ECM 22 generates once the fuel shift differential trace 312 exceeds the fuel shift threshold trace 310.

Trace 320 represents a diagnostic "fail" signal that remains zero in this case because the valve 34 opened as intended.

Figure 4:
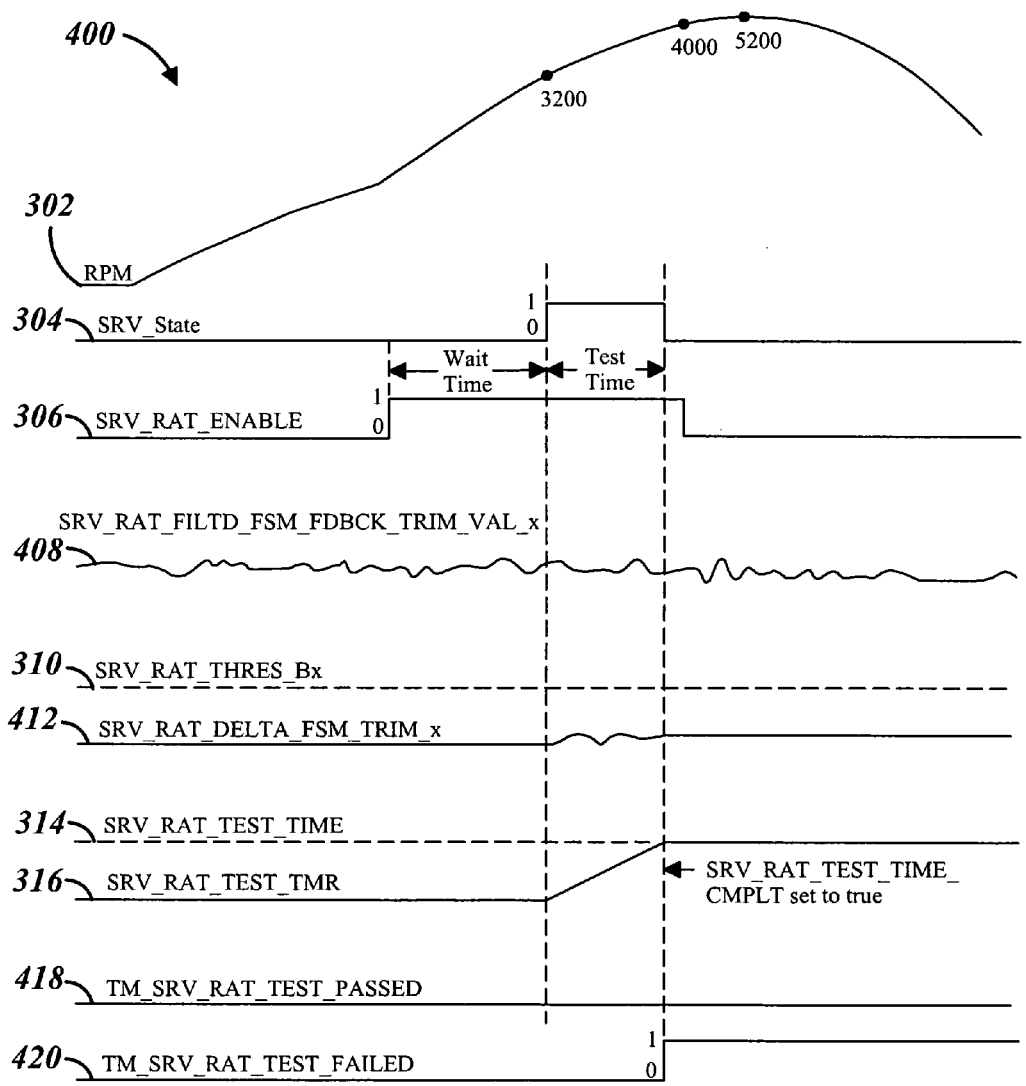
FIG. 4 is a signal plot of an unsuccessful short runner valve diagnostic showing traces of various signals generated by the short runner valve diagnostic system in carrying out the method.

FIG. 4 shows a signal plot from an unsuccessful run of the short runner valve diagnostic method. This plot is similar in many respects to the plot of FIG. 3 and like numerals between the embodiments generally designate like or corresponding traces between drawing figures. Additionally, the description of the previous plot is incorporated by reference and the common subject matter may generally not be repeated here.

The plot of FIG. 4 illustrates somewhat different traces of the same signals discussed above, because the results are different. The differences will be described herein below.

Trace 408 is substantially flat because the ECM 22 does not detect a sustained drop in fuel shift from the exhaust sensor 42. Accordingly, trace 412 is substantially flat because there is no substantial differential in fuel shift. But the trace 412 indicates a slight differential, which is the result of slight movement caused by the motor 40 being energized and coupled to the short runner valve 34, which is presumably stuck or otherwise not functioning properly. Therefore, once the test timer trace 316 exceeds the test timer threshold trace 314, a test diagnostic failed trace 420 changes state from "0" to "1", while a test diagnostic passed trace 418 stays "0".

While certain preferred embodiments have been shown and described, persons of ordinary skill in this art will readily recognize that the preceding description has been set forth in terms of description rather than limitation, and that various modifications and substitutions can be made without departing from the spirit and scope of the invention. By way of example without limitation, while the exhaust sensor has been described as being an oxygen sensor, it could be otherwise any suitable type of emissions sensor. Of course, still other modifications and substitutions can be made. The invention is defined by the following claims.

What is claimed is:

1. A method of diagnosing an operating condition of a short runner valve in an intake manifold of an internal combustion engine, the method comprising the steps of:

commanding the short runner valve to an open position for a test period;

resolving whether the test period has elapsed;

determining whether a sensed exhaust gas parameter has exceeded a threshold during the test period;

issuing a pass signal if the sensed exhaust gas parameter has exceeded the threshold within the test period; and issuing a fail signal if the sensed exhaust gas parameter has not exceeded the threshold within the test period.

2. The method of claim 1, further comprising the steps of:
monitoring enable conditions for a diagnostic routine that includes the steps of claim 1;
determining whether the enable conditions are met; and
initiating the diagnostic routine if the enable conditions are met.

3. The method of claim 2, wherein the enable conditions include an engine running elapsed time, engine coolant temperature, vehicle speed, and engine speed.

4. The method of claim 3, further comprising:
determining whether the diagnostic routine has already been carried out within the engine running elapsed time; and
initiating the diagnostic routine if the diagnostic routine has not been carried out within the engine running elapsed time.

5. The method of claim 4, wherein the enable conditions are met if the engine running elapsed time and engine coolant temperature are greater than respective target values, and if the vehicle speed and engine speed are between respective minimum and maximum reference values.

6. The method of claim 5, wherein the engine running elapsed time is greater than two minutes.

7. The method of claim 6, wherein the engine coolant temperature is greater than 70 degrees Celsius.

8. The method of claim 7, wherein the vehicle speed minimum and maximum reference values are approximately 26 and 75 MPH.

9. The method of claim 8, wherein the engine speed minimum and maximum reference values are approximately 3500 and 4200 RPM.

10. A method of diagnosing an operating condition of a short runner valve in an intake manifold of an internal combustion engine using an exhaust sensor in an exhaust manifold of the internal combustion engine, the method comprising the steps of:
monitoring enable conditions for a diagnostic routine;
determining whether the enable conditions are met;
initiating the diagnostic routine if the enable conditions are met, wherein the diagnostic routine includes the following steps:
commanding the short runner valve to an open position for a test period;
resolving whether the test period has elapsed;
monitoring an exhaust gas fuel-to-air ratio using the exhaust sensor;
determining whether the fuel-to-air ratio has exceeded a threshold during the test period;
issuing a pass signal if the exhaust gas fuel-to-air ratio has exceeded the threshold within the test period; and
issuing a fail signal if the exhaust gas fuel-to-air ratio has not exceeded the threshold within the test period.

11. The method of claim 10, wherein the enable conditions include an engine running elapsed time, engine coolant temperature, vehicle speed, and engine speed.

12. The method of claim 11, further comprising:
determining whether the diagnostic routine has already been carried out within the engine running elapsed time; and
initiating the diagnostic routine if the diagnostic routine has not been carried out within the engine running elapsed time.

13. The method of claim 12, wherein the enable conditions are met if the engine running elapsed, time and engine coolant temperature are greater than respective target values, and if the vehicle speed and engine speed are between respective minimum and maximum reference values.

14. The method of claim 13, wherein the engine running elapsed time is greater than two minutes.

15. The method of claim 14, wherein the engine coolant temperature is greater than 70 degrees Celsius.

16. The method of claim 15, wherein the vehicle speed minimum and maximum reference values are approximately 26 and 75 MPH.

17. The method of claim 16, wherein the engine speed minimum and maximum reference values are approximately 3500 and 4200 RPM.

18. A control system for diagnosing an operating condition of a short runner valve in an intake manifold of an internal combustion engine having an exhaust manifold, the system comprising:
an airflow measurement device;
a short runner valve motor operably connected to the short runner valve; and
an engine control module in communication with the short runner valve motor and the air flow measurement device, and including memory and a processor in communication therewith and being configured to carry out computer readable instructions stored in the memory and comprising the steps of:
commanding the short runner valve to an open position for a test period;
resolving whether the test period has elapsed;
determining whether a sensed exhaust gas parameter from the air flow measurement device has exceeded a threshold during the test period;
issuing a pass signal if the sensed exhaust gas parameter has exceeded the threshold within the test period; and
issuing a fail signal if the sensed exhaust gas parameter has not exceeded the threshold within the test period.

19. The system of claim 18, wherein the air flow measurement device comprises an exhaust sensor, and wherein the exhaust sensor is positioned in the exhaust manifold.

20. The system of claim 18, further comprising an engine coolant temperature sensor, wherein the processor monitors input from the sensors and initiates a diagnostic routine if the engine running elapsed time and engine coolant temperature are greater than respective target values.

21. The system of claim 20, further comprising a vehicle speed sensor and an engine speed sensor, wherein the processor monitors input from the sensors and initiates a diagnostic routine if the vehicle speed and engine speed are between respective minimum and maximum reference values.

* * * * *